3,320,301
PRODUCTION OF AROMATIC SULFONIC
ACID ESTERS
Alexander F. MacLean, Corpus Christi, Tex., assignor to
Celanese Corporation, a corporation of Delaware
No Drawing. Filed Sept. 18, 1963, Ser. No. 309,851
7 Claims. (Cl. 260—456)

This invention relates broadly to the production of aromatic compounds. More particularly it is concerned with the preparation of esters represented by the general formula (I) $\qquad R-O-SO_2-R'$ where R represents a radical selected from the group consisting of aromatic hydrocarbon radicals and nuclearly halogenated aromatic hydrocarbon radicals, and R' represents a lower alkyl radical, e.g., one containing from 1 to 5 carbon atoms, inclusive.

Specifically the method of this invention comprises oxidizing an aromatic compound selected from the group consisting of aromatic hydrocarbons and nuclearly halogenated aromatic hydrocarbons with a bis(lower alkanesulfonyl) peroxide (ASP) and wherein the lower alkane (normal or isomeric form where the latter exists) portion of the molecule corresponds to the lower alkyl radical represented by R' in Formula I. Thus, when the bis(lower alkanesulfonyl) peroxide is bis(methanesulfonyl) peroxide (MSP), which is preferred for use, and the compound that is oxidized is an aromatic or a nuclearly halogenated aromatic hydrocarbon, the resulting ester can be represented by the general formula (II) $\qquad R-O-SO_2-CH_3$ where R has the same meaning as in Formula I.

The scope of the invention also includes method features wherein compounds embraced by Formulas I and II are hydrolyzed to the corresponding compounds represented by R—OH.

Taking MSP as illustrative of the peroxide employed, the ester-forming reaction may be illustrated by the following equation in which R has the same meaning as in Formula I:

(III) $R \cdot H + (CH_3 \cdot SO_2 \cdot O \cdot)_2 \rightarrow R \cdot O \cdot SO_2 \cdot CH_3 + CH_3 \cdot SO_2 \cdot OH$ A significant by-product of the reaction (not shown in the above equation) is usually a dehydrogenated "dimer" of the aromatic compound.

The esters can be hydrolyzed under acidic or alkaline conditions to the corresponding hydroxy-aromatic (or nuclearly halogenated hydroxy-aromatic) hydrocarbon and methanesulfonic acid (MSA), as illustrated by the following equation in which R again has the same meaning as in Formula I:

(IV) $R \cdot O \cdot SO_2 \cdot CH_3 + H_2O \rightarrow R \cdot OH + CH_3 \cdot SO_2 \cdot OH$ Thus the present invention provides a class of intermediates that can be used in synthesizing phenol and various substituted phenols, as well as other hydroxy-aromatic and nuclearly halogenated hydroxy-aromatic hydrocarbons. Such intermediates are especially valuable in producing hydroxylated aromatic hydrocarbons that are difficult and/or costly to produce by other means.

Illustrative examples of radicals represented by R in Formulas I and II (also in R—OH) and in Equations III and IV are the unsubstituted mono- and polyaryl radicals, the alkyl-substituted mono- and polyaryl radicals, and the halogeno-(chloro-, bromo-, fluoro-, iodo-) substituted mono- and polyaryl radicals. The monaryl radical or the polyaryl radical may be partly or completely substituted with an alkyl and/or a halogeno substitutent. More specific examples of such radicals are phenyl, biphenylyl or xenyl, naphthyl, tolyl, xylyl, ethylphenyl, the propylphenyl, octadecylphenyl (both normal and isomeric forms of the saturated aliphatic substituent), higher alkylphenyl and the corresponding nuclearly substituted halo-(chloro-, bromo-, fluoro-, and iodo-) aromatic hydrocarbon radicals, including the partly halogenated and perhalogenated forms thereof, and wherein the halogen is the same or different in the individual radical.

It was known prior to the present invention that a bis(lower alkanesulfonyl) peroxide, specifically MSP was a catalyst for the polymerization of vinyl chloride, vinylidene chloride and mixtures thereof; and that this species of peroxide could be prepared by the anodic oxidation of methanesulfonic acid (U.S. Patent No. 2,619,507 dated Nov. 25, 1952). However, to the best of my knowledge and belief it was previously unknown that MSP would oxidize (or could be caused to oxidize) an aromatic or a nuclearly halogenated aromatic hydrocarbon to yield an ester thereof.

A bis(lower alkanesulfonyl) peroxide, and specifically MSP, has unique advantages over other peroxides, more particularly organic peroxides. MSP can be prepared by electrolysis in high current yield, and the value resulting from rupture of the oxygen-oxygen bond is relatively stable. In marked contrast, organic peroxides in general cannot be made by electrolysis, and the values resulting from rupture of the oxygen-oxygen bond decompose further to yield such products as, for example, alkyl radicals, acetone and carbon dioxide. Since the value derived from the rupture of the oxygen-oxygen bond of MSP is relatively stable, it can remain in the system until it adds to a double bond (as in an aromatic or a nuclearly halogenated aromatic hydrocarbon) to yield esters or abstracts hydrogen to regenerate methanesulfonic acid. The sulfonic acid can be recycled to regenerate the peroxide; or, additionally, as was mentioned hereinbefore, the ester can be hydrolyzed to yield a hydroxy-aromatic (or a nuclearly halogenated hydroxy-aromatic) hydrocarbon and methanesulfonic acid, which latter also can be recycled to regenerate the peroxide.

In general, the method of the present invention provides a high yield of the desired ester. This is particularly true when the ester is made from benzene or toluene. The reaction, which proceeds in the absence of a solvent as well as in a wide variety of solvents, has the characteristics of an ionic reaction. The distribution of isomeric esters from, for example, toluene, indicates an ionic reaction.

Surprisingly and unobviously, the alkyl (e.g., methyl and isopropyl) in alkyl-substituted aromatic hydrocarbons are not selectively oxidized by MSP as normally might be expected. This would indicate that the methanesulfonoxy value adds to a double bond in preference to abstracting hydrogen from a side chain. Ortho and para replacement of hydrogen take preference over meta. Para replacement of hydrogen over ortho seems to be preferred, e.g., by a ratio of 2 or 3 to 1 in a number of the compounds oxidized.

An intermediate dihydro-aromatic hydrocarbon derivative, specifically a dihydrobenzene derivative, which is believed to be produced in the process decomposes into the more stable phenyl methanesulfonate. A small portion of the latter is usually converted into a small amount of a "dimer," to which reference has been made hereinbefore, and MSA. This "dimer" is biphenyl when the starting aromatic hydrocarbon reactant is benzene.

The method of this invention can be carried out continuously, semi-continuously or by batch technique. The reaction process satisfactorily at ambient temperatures, e.g., at temperatures of the order of about 15° C. to about 40° C. The use of lower or higher temperatures (e.g., from 0° C. to 100° C. and higher) is sometimes advantageous, and especially temperatures between 50° and 100° C. Atmospheric, sub-atmospheric or super-atmospheric pressures may be employed.

Advantageously an excess of aromatic compound over peroxide is used. For example the ASP, specifically MSP, may constitute as little as about 1.0 mole percent of the total molar amount of aromatic compound and peroxide. In a batch operation the mole percent of peroxide component generally ranges between about 2 and about 20 mole percent, and in a continuous operation between about 2 and about 20 mole percent of the total molar amount of aromatic compound and peroxide.

Various modifiers may be added to the reaction mass to effect changes in the yields of the individual products. Varivalent metal ions, e.g., $Co^{++}$, $Ce^{+++}$, $Mn^{++}$, $Cu^{++}$, and others may be employed for this purpose. $Cu^{++}$ tends to increase the over-all yield of products.

The modifier may be a polar medium, for instance a saturated aliphatic carboxylic acid, more particularly a monocarboxylic acid, e.g., acetic, propionic, butyric, valeric, etc., or a polycarboxylic acid, e.g., succinic, adipic, etc. Using acetic acid in a 50–50 volume ratio with toluene, the amount of "dimer" produced is considerably reduced, the isomer ratio is relatively unaffected, and the yield of ester is at least as high, if not higher, than when the reaction is carried out in the absence of acetic acid. Other modifiers which are applicable to this invention are carboxylic acid nitriles, e.g., acetonitrile, and difficulty oxidizable alcohols, e.g., t-butanol. Generally any difficulty oxidizable material which improves the mutual solubility of the ASP and the aromatic compound being oxidized is suitable.

In order that those skilled in the art may better understand how the present invention can be carried into effect, the following examples are given by way of illustration and not by way of limitation. All percentages are by weight unless otherwise stated.

Example 1

Bis(methanesulfonyl) peroxide (MSP), 0.398 g. of 98% material (a crystalline solid), or 2.04 millimoles, was dissolved in 25 cc. of benzene. The solution was stirred in an atmosphere of helium for 20 hrs. at 24° C. All of the peroxide reacted. No gas evolution was observed.

The products were analyzed by gas-liquid phase chromatography. They were identified by comparison of their emergence times in the chromatographic analyses and by a comparison of their mass spectrum analyses with those obtained from an authentic sample.

The only products were biphenyl, 0.12 millimole, and phenyl methanesulfonate, 1.38 millimoles. These amounts correspond to a yield of 5.8% biphenyl and 67% phenyl methanesulfonate based on the amount of MSP used.

Example 2

MSP, 0.0098 g. of 98% material or 0.05 millimole, was dissolved in benzene to give 3 cc. of solution. The solution was kept for 24 hours at room temperature (about 25°–30° C.) for 24 hours, and thereafter analyzed. The yield of phenyl methanesulfonate was 75% and the yield of biphenyl was 14% based on the amount of MSP peroxide used.

Example 3

Essentially the same as described under Example 2 with the exception that a solution containing 75% benzene and 25% acetic acid by volume was employed as the solvent. The yield of phenyl methanesulfonate was 58% and the yield of biphenyl was 4% based on the amount of MSP employed.

Example 4

MSP, 0.0098 g. or 0.05 millimole was dissolved in 50% toluene–50% acetic acid by volume to give 3 cc. of solution, and kept for 24 hours at room temperature under an atmosphere of air.

The products and yields, based on the amount of MSP used, were:

|  | Percent |
| --- | --- |
| o-Cresyl methanesulfonate | 29 |
| p-Cresyl methanesulfonate | 51 |
| Condensation product of two toluene molecules [1] | 3 |

[1] That condensation product is a compound having the structural formula.

(V) 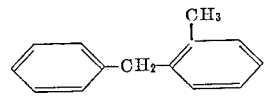

Example 5

MSP, 0.0098 g. or 0.05 millimole was dissolved in 50% chlorobenzene–50% acetic acid by volume to give 3 cc. of solution and kept for 24 hours at room temperature under an atmosphere of air.

The yield of o-chlorophenyl methanesulfonate was 21% and of p-chlorophenyl methanesulfonate, 29%, based on peroxide consumed.

Example 6

This example shows (Runs 6–A, –B and –C) the effect of adding media of different polarities. Run 6–D shows the effect of keeping the peroxide concentration at a very low level. The reaction was carried out as follow: The stated amounts of reacants, etc., were mixed in capped, 2-ounce bottles under an air atmosphere at room temperature and the reaction was allowed to take place for 72 hours. The products were determined by gas chromatography. In Run 6–D the products were concentrated by distillation before analysis.

The details concerning the ingredients and amounts employed, and the results obtained, are given in Table I.

TABLE I

| Example Number | 6–A | 6–B | 6–C | 6–D |
| --- | --- | --- | --- | --- |
| Toluene, ml | 2.5 | 2.5 | 2.5 | 40 |
| Solvent | | Acetic acid | n-Octane | |
| Solvent, ml | | 2.5 | 2.5 | |
| MSP, micromoles | 231 | 255 | 257 | a 27 |
| Dimer Yield, percent | 5.0 | 0.89 | 6.3 | 1.9 |
| o-Ester Yield, percent | 23.8 | 28.4 | 24.7 | 24.5 |
| m-+p-Ester Yield, percent | 46.2 | 52.2 | 39.6 | 42.8 |
| Total Yield, percent | 75.0 | 81.5 | 70.6 | b 69.2 |
| Ester/Dimer | 14 | 90 | 10 | 35 |
| m-+p-Ester/o-Ester | 1.94 | 1.84 | 1.60 | 1.75 | a The peroxide was added in 5 mx. batches at 1- to 3-day intervals.
b In addition to the reported product, 2.4 micromoles of benzyl alcohol and 6.9 micromoles of benzaldehyde were also found. This would make the total yield 81.9%.

Referring to Table I it will be noted that using, by volume, 50% acetic acid and 50% toluene the production of "dimer" was considerably reduced. The isomer ratio was relatively unaffected. The yield seems to have been slightly enhanced. In the relatively nonpolar medium of toluene alone (6–A) more "dimer" was produced. In a still less polar medium, viz., 6–C, wherein was employed, 50% n-octane and 50% toluene by volume, the yield of dimer was further increased but the percentage change was relatively less. Note also in 6–C that the isomer ratio was materially changed, that is, there was less selectivity for m- plus p-ester formation. Example 6–D shows that, by keeping the peroxide concentration at a very low level, the production of "dimer" was significantly reduced.

Example 7

This example illustrates the effect of temperature in carrying out the reaction. The run of 7–A was made by mixing the reactants after they had been previously chilled to 0° C., and maintaining this temperature for 11 days. The run of 7–B, which was carried out at room temperature (about 25° C.) for about 20 hours is the same run that was identified as 6–A in Table I. It is repeated in Table II, which follows, for ease in comparing the results with those obtained in runs made at lower and higher temperatures. The run of 7–C was made by adding 10 to 20 mg. portions of MSP dissolved in 20 microliters of acetic anhydride to 150 ml. toluene which was maintained for 20 hours in a stirred flask at 100° C. The MSP appeared to react instantly. The products of this run were concentrated by distillation before analysis.

TABLE II

| Example Number | 7-A | 7-B | 7-C |
|---|---|---|---|
| Temperature, ° C | 0 | 25 | 100 |
| Toluene, ml | 31 | 2.5 | 150 |
| MSP, micromoles | 915 | 231 | 520 |
| Dimer Yield, percent | 2.3 | 5.0 | 22.5 |
| o-Ester Yield, percent | 17.3 | 23.8 | 39.6 |
| M-+p-Ester Yield, percent | 53.4 | 46.2 | 39.6 |
| Total Yield, Percent | 73.0 | 75.0 | 101.7 |
| Ester/Dimer | 31 | 14 | 3.5 |
| m-+p-Ester/o-Ester | 3.1 | 1.94 | 1.0 |

In addition to the products reported in the runs of Table II, there was also obtained from the run of 7–C 243 micromoles of benzaldehyde and 185 micromoles of benzyl alcohol. These products were probably made by aerial oxidation, since all the peroxide is otherwise accounted for in forming other products of the reaction.

*Example 8*

This example illustrates a continuous method of operation.

MSP was prepared by the anodic oxidation of 10 M methanesulfonic acid in water. About 50 cc. of electrolyte was required to maintain the correct level in the equipment. A current of one ampere was passed through the electrolyte in an electrolysis cell. The cell contained about 30 cc. of the electrolyte. Two platinum electrodes havin ga diameter of 0.082 mm. were used. Their areas were about 0.5 cm.$^2$.

In operation the electrolyte is recycled through the system. The procedure is essentially at follows:

(1) The electrolyte is oxidized in the electrolysis cell on the platinum anode to MSP. The peroxide sloughs off from the anode and dissolves rapidly in the stirred electrolyte within the cell. Its concentration in the electrolyte remains less than 2%.

(2) The electrolyte overflows from the cell and joins a stream of the aromatic compound to be oxidized. The streams are not miscible but the MSP is soluble in the aromatic phase.

(3) Since heat is generated in the electrolysis cell, the mixture is passed through a mixer-cooler to remove the heat. The MSP is partly extracted by the aromatic phase.

(4) The aromatic phase and electrolyte phase are separated. The aromatic phase goes to a reactor-receiver where it is reacted to completion with the MSP.

(5) The electrolyte phase from the separator is recycled to the reactor, e.g., by means of a pump.

In general, the temperature in the reactor was held at 20°–30° C. Higher or lower temperatures can be used as desired or as conditions may require for optimum operation. The recycle-pump rate was about 15 cc. per minute. Nitrogen gas (unless otherwise indicated that oxygen was employed) was passed through the receiver and used to sweep gas from the electrolysis cell from the system.

The feed rate of the aromatic compound varied from 50 to 100 cc. per hour. The system was operated at a steady state with 1 ampere current in the cell. A portion of representative aromatic phase from the phase separator was collected in the reactor receiver and allowed to react to completion. In general, 20 hours was allowed for completion of the reaction.

Substantially the same procedure was used in identification and quantitative analysis of the products from the various runs.

A 10-cc. portion of the crude product was saponified at reflux for 30 minutes in 10 cc. of methanol plus 1 g. KOH. This converted the aromatic methanesulfonate esters to the potassium salts of the corresponding hydroxy-aromatic compound. The saponified product was extracted with 25 cc. of water, and the aromatic phase separated with non-aromatic compounds dissolved in it. The potassium salts of phenolic-type compounds remained in the aqueous phase.

A 10-cc. portion of the crude product was saponified as described in the preceding paragraph. However, before the aqueous extraction was performed, 2 cc. of acetic acid was added. The acetic acid released the free hydroxy-aromatic compounds. The acidified material was extracted with 25 cc. of water, and the aromatic phase containing hydroxy-aromatic compounds and, in some cases, aromatic compounds was separated.

The crude product and the two treated portions were fractionated into their pure components by liquid-gas phase chromatography. Various cuts were identified by comparison with their emergency times with those of reference compounds. They were trapped in their pure state and characterized by their mass spectra.

The quantitative analysis was based on a determination of the sulfonate esters and aromatic dimers in the crude product. The area under the various peaks was measured and converted to moles or grams of corresponding product.

Details and results of typical runs are given in Table III. The letter S in the chemical formulas of some of the reaction products given in this table represents a methanesulfonoxy value. Only the ortho and para isomers are given in Table III. The para fractions of the various aromatic compounds may also contain the corresponding meta isomer.

TABLE III

| Compound Oxidized | | Reaction Products | |
|---|---|---|---|
| Chemical Formula | Feed rate, cc./hr. | Chemical Formula | Millimoles |
| $C_6H_6$ [a] | 60 | $C_6H_5 \cdot C_6H_5$ | 0.33 |
| | | $C_6H_5 \cdot S$ | 8.84 |
| $CH_3 \cdot C_6H_5$ [b] | 62 | $CH_3 \cdot C_6H_4 \cdot C_6H_4 \cdot CH_3$ [c] | 0.88 |
| | | $o\text{-}CH_3 \cdot C_6H_4 \cdot S$ | 2.03 |
| | | $p\text{-}CH_3 \cdot C_6H_4 \cdot S$ | 4.98 |
| $p\text{-}CH_3 \cdot C_6H_4 \cdot CH_3$ [b] | 60 | Unknown [d] | [e] .275 |
| | | $2,6\text{-}(CH_3)_2 \cdot C_6H_3 \cdot S$ | 1.23 |
| $(CH_3)_2 \cdot CH \cdot C_6H_5$ | 60 | No dimer found [f] | |
| | | $o\text{-}(CH_3)_2 \cdot CH \cdot C_6H_4 \cdot S$ | 0.87 |
| | | $p\text{-}(CH_3)_2 \cdot CH \cdot C_6H_4 \cdot S$ | 2.72 |
| $Cl \cdot C_6H_5$ | 90 | No dimer found | |
| | | $o\text{-}Cl \cdot C_6H_4 \cdot S$ | 1.70 |
| | | $p\text{-}Cl \cdot C_6H_4 \cdot S$ | 3.62 |

[a] This run was made with an oxygen sweep instead of nitrogen.
[b] Toluene oxidation gave a trace of benzaldehyde and p-xylene oxidation gave a trace of p-methylbenzaldehyde.
[c] By mass-spectrometric analysis this compound appears to be the ring-joined dimer of toluene.
[d] The mass-spectrometric analysis of this compound did not indicate it to be the ring-joined dimer of p-xylene. The compound was apparently not a phenolic-type ester.
[e] Grams of product.
[f] No evidence for aromatic dimer formation. All the high-boiling products were saponified by caustic methanol to phenolic-type compounds.

In Table IV are given the results of liquid-gas phase chromatographic identification of the aromatic compounds obtained by oxidation of typical aromatic and nuclearly halogenated aromatic hydrocarbons with MSP, followed by hydrolysis of the sulfonate ester initially produced to the corresponding free hydroxy-aromatic compound.

| Compound Oxidized | Proposed Products | Emergence Times, min. | |
|---|---|---|---|
| | | Reaction Product | Authentic Sample |
| $C_6H_6$ | $C_6H_5 \cdot O \cdot SO_2 \cdot CH_3$ | 29.3 | |
| | $C_6H_5 \cdot C_6H_5$ | 10.5 | 10.3 |
| | $C_6H_5 \cdot OH$ | 8.7 | 8.6 |
| $CH_3 \cdot C_6H_5$ | $o\text{-}CH_3 \cdot C_6H_4 \cdot O \cdot SO_2 \cdot CH_3$ | 31.6 | |
| | m and $p\text{-}CH_3 \cdot C_6H_4 \cdot O \cdot SO_2 \cdot CH_3$ | 42.3 | |
| | $p,p\text{-}CH_3 \cdot C_6H_4 \cdot C_6H_4 \cdot CH_3$ | 15.2 | |
| | $o\text{-}CH_3 \cdot C_6H_4 \cdot OH$ | 8.4 | 8.3 |
| | m and $p\text{-}CH_3 \cdot C_6H_4 \cdot OH$ | 11.0 | 11.0 |
| $p\text{-}(CH_3)_2 \cdot C_6H_4$ | $(CH_3)_2 \cdot C_6H_3 \cdot O \cdot SO_2 \cdot CH_3$ | 33.7 | |
| | $(CH_3)_2 \cdot C_6H_3 \cdot C_6H_3(CH_3)_2$ | 24.9 | |
| | $(CH_3)_2 \cdot C_6H_3 \cdot OH$ | 10.9 | 10.7 |
| $(CH_3)_2CH \cdot C_6H_5$ | $o\text{-}(CH_3)_2 \cdot CH \cdot C_6H_4 \cdot O \cdot SO_2 \cdot CH_3$ | 35.0 | |
| | m and $p\text{-}(CH_3)_2 \cdot CH \cdot C_6H_4 \cdot O \cdot SO_2 \cdot CH_3$ | 59.0 | |
| | $(CH_3)_2 \cdot CH \cdot C_6H_4 \cdot C_6H_4 \cdot CH(CH_3)_2$ | Not observed | |
| | $o\text{-}(CH_3)_2 \cdot CH \cdot C_6H_4 \cdot OH$ | 11.8 | 11.7 |
| | m and $p\text{-}(CH_3)_2 \cdot CH \cdot C_6H_4 \cdot OH$ | 17.0 | 17.0 |
| $Cl \cdot C_6H_5$ | $o\text{-}Cl \cdot C_6H_4 \cdot O \cdot SO_2 \cdot CH_3$ | 52.0 | |
| | m and $p\text{-}Cl \cdot C_6H_4 \cdot O \cdot SO_2 \cdot CH_3$ | 67 | |
| | $Cl \cdot C_6H_4 \cdot C_6H_4 \cdot Cl$ | Not observed | |
| | $o\text{-}Cl \cdot C_6H_4 \cdot OH$ | 5.8 | 5.5 |
| | $m\text{-}Cl \cdot C_6H_4 \cdot OH$ | 31.3 | 32.0 |

Instead of carrying out the hydrolysis step separately by batch technique as described in the foregoing Example 8, it can be done continuously or semi-continuously. Also, such a continuous or semi-continuous hydrolysis step can be made a part of a method, more particularly a continuous method, of making a hydroxy-aromatic (or nuclearly halogenated hydroxy-aromatic) compound from the corresponding non-hydroxylated compound, e.g., phenol from benzene, cresol from toluene, etc. In other words, not only can the ASP, specifically MSP, be generated continuously and be continuously reacted with the aromatic hydrocarbon, but the aromatic sulfonic esters initially obtained can be continuously hydrolyzed as a step in the overall process. Alternatively, the ASP can be separately prepared, and then continuously reacted with the aromatic compound, followed by continuous, semi-continuous or batch hydrolysis of the sulfonate ester.

It will be understood, of course, by those skilled in the art that the present invention is not limited to the use of the specific ingredients, proportions thereof, temperature, time and other conditions of reaction that are given in the foregoing detailed description and examples by way of illustration.

The embodiments of the invention in which an exclusive property or privilege is claimed are defined as follows:

1. The method of producing an ester represented by the general formula $$R\text{---}O\text{---}SO_2R'$$

where R represents a radical selected from the group consisting of aromatic hydrocarbon radicals and nuclearly halogenated aromatic hydrocarbon radicals, and R' represents a lower alkyl radical, said method comprising oxidizing an aromatic compound selected from the group consisting of aryl hydrocarbons, alkaryl hydrocarbons and nuclearly halogenated aromatic hydrocarbons with a bis(methanesulfonyl) peroxide.

2. The method of producing phenyl ester of methanesulfonic acid which comprises oxidizing benzene with bis(methanesulfonyl) peroxide.

3. The method of producing tolyl ester of methanesulfonic acid which comprises oxidizing toluene with bis(methanesulfonyl) peroxide.

4. The method of producing xylyl ester of methanesulfonic acid which comprises oxidizing xylene with bis(methanesulfonyl) peroxide.

5. The method of producing cumyl ester of methanesulfonic acid which comprises oxidizing cumene with bis(methanesulfonyl) peroxide.

6. The method of producing chlorinated phenyl ester of methanesulfonic acid which comprises oxidizing chlorinated benzene with bis(methanesulfonyl) peroxide.

7. The method of producing an ester represented by the general formula $$R\text{---}O\text{---}SO_2\text{---}CH_3$$

where R represents a radical selected from the group consisting of aromatic hydrocarbon radicals and nuclearly halogenated aromatic hydrocarbon radicals, said method comprising (A) continuously generating bis(methanesulfonyl) peroxide, (B) continuously bringing the freshly generated bis(methanesulfonyl) peroxide into reactive relationship with a flowing stream comprising an aromatic compound selected from the group consisting of aromatic hydrocarbons and nuclearly halogenated aromatic hydrocarbons, and (C) separating an ester represented by the above-given formula from the reaction mass.

No references cited.

CHARLES B. PARKER, *Primary Examiner.*

JOSEPH P. BRUST, *Examiner.*

FLOYD D. HIGEL, *Assistant Examiner.*

UNITED STATES PATENT OFFICE

CERTIFICATE OF CORRECTION

Patent No. 3,320,301            May 16, 1967

Alexander F. MacLean

It is certified that error appears in the above identified patent and that said Letters Patent are hereby corrected as shown below:

Column 4, TABLE I, fifth column, line 4 thereof, "27" should read -- 127 --.

Signed and sealed this 19th day of August 1969.

(SEAL)
Attest:

Edward M. Fletcher, Jr.           WILLIAM E. SCHUYLER, JR.
Attesting Officer           Commissioner of Patents